US00RE38866E

(19) United States
(12) Reissued Patent
Myhre

(10) Patent Number: US RE38,866 E
(45) Date of Reissued Patent: Nov. 8, 2005

(54) PRESSURE-BOOST DEVICE FOR DOWNHOLE TOOLS

(75) Inventor: Morten Myhre, Tananger (NO)

(73) Assignee: Baker Hughes Incorporated, Houston, TX (US)

(21) Appl. No.: 10/825,671

(22) Filed: Apr. 15, 2004

Related U.S. Patent Documents

Reissue of:
(64) Patent No.: 5,791,412
Issued: Aug. 11, 1998
Appl. No.: 08/954,808
Filed: Oct. 21, 1997

U.S. Applications:
(63) Continuation of application No. 08/514,876, filed on Aug. 14, 1995, now abandoned.

(51) Int. Cl.[7] ..... E21B 23/04
(52) U.S. Cl. ..... 166/106; 166/243
(58) Field of Search ..... 166/72, 106, 243

(56) References Cited

U.S. PATENT DOCUMENTS

| | | | | | |
|---|---|---|---|---|---|
| 2,624,412 | A | * | 1/1953 | Ragan | 166/120 |
| 2,881,841 | A | * | 4/1959 | Page, Jr. | 166/212 |
| 3,139,140 | A | * | 6/1964 | Brown | 166/120 |
| 3,344,861 | A | * | 10/1967 | Claycomb | 166/120 |
| 3,381,766 | A | * | 5/1968 | Bannister | 175/106 |
| 4,733,568 | A | * | 3/1988 | Koopmans et al. | 73/784 |
| 4,892,149 | A | * | 1/1990 | Hoes et al. | 166/379 |
| 4,928,769 | A | * | 5/1990 | Milberger et al. | 166/382 |
| 5,070,941 | A | * | 12/1991 | Kilgore | 166/98 |

FOREIGN PATENT DOCUMENTS

| | | | | |
|---|---|---|---|---|
| EP | 0661459 A1 | * | 7/1995 | |
| GB | 1068355 | * | 5/1967 | |
| GB | 2100347 | * | 12/1982 | |
| RU | 604973 | * | 4/1978 | 166/120 |
| RU | 926238 | * | 5/1982 | 166/120 |
| WO | WO 81/01692 | | 6/1981 | |
| WO | WO 91/07566 | * | 5/1991 | |

* cited by examiner

*Primary Examiner*—Hoang Dang
(74) *Attorney, Agent, or Firm*—Steven Rosenblatt

(57) ABSTRACT

A pressure-boosting apparatus particularly amenable for use in downhole applications is disclosed. The pressure-boosting apparatus employs an unbalanced piston which is initially fixated in a run-in position. The piston has a flowpath therethrough in which is mounted a check valve. Initially, pressure is applied to above and below the piston which results in an unbalanced force on the piston due to its configuration. Flow to the tool initiates its actuation at this time. When the unbalanced force reaches a predetermined level, the piston is no longer fixated to the housing and begins to accelerate. Acceleration of the piston closes the check valve due to the sudden decrease in pressure behind the check valve and an increase in pressure in front of the check valve as the fluid volume in front of the piston is compressed. Due to the proportional relationship between pressure and area, a magnification of force originally delivered by the pump is achieved for completion of the setting of a downhole tool such as a packer or bridge plug or the like.

15 Claims, 1 Drawing Sheet

PRESSURE-BOOST DEVICE FOR DOWNHOLE TOOLS

Matter enclosed in heavy brackets [ ] appears in the original patent but forms no part of this reissue specification; matter printed in italics indicates the additions made by reissue.

This application is a continuation of application Ser. No. 08/514,876, filed Aug. 14, 1995, now abandoned.

FIELD OF THE INVENTION

The field of this invention relates to pressure-boosting devices, particularly those that are configurable for use with downhole tools.

BACKGROUND OF THE INVENTION

In the past, many downhole tools, such as bridge plugs or packers, have been used that are settable hydraulically. In some applications, the downhole tool is positioned in the wellbore with a wireline. Attached to the wireline assembly is a downhole pump which takes suction within the wellbore and builds the pressure up into the downhole tool for its actuation. Typically, these downhole pumps are driven by downhole motors are supplied with electrical power from the wireline and are limited in their pressure output to output pressures in the order of up to about 3,000 psig. Lately, the technology in downhole tools, particularly bridge plugs and packers, has evolved where higher setting pressures are required to assure the sealing integrity of the packer or plug. This is particularly true in environments where larger differential pressures are expected and the sealing force must be enhanced to a sufficient level to withstand the expected differentials across the plug or packer.

In the past, the physical configuration of the downhole pumps, as well as the logistics of supplying sufficient power to operate downhole motors, has been a limiting factor in the ability to apply setting pressure to bridge plugs or packers and similar hydraulically settable downhole tools. One solution to the space problem in the wellbore has been to stack a plurality of pistons in parallel so that the available setting pressure acts simultaneously on all the pistons. However, these devices did not magnify the applied pressure and, hence, the applied pressure available for setting the downhole tool.

Accordingly, it is an objective of the present invention to provide a simple device which can be readily used in conjunction with the pressure developing pump or a similar device used to create the motive force to set the downhole tool. It can also be used when the tool is run on tubing and a boost force is needed. The boosting device operates automatically and is simple to construct and effective to get a predetermined ratio of increase in applied force to set a downhole tool.

SUMMARY OF THE INVENTION

A pressure-boosting apparatus particularly amenable for use in downhole applications is disclosed. The pressure-boosting apparatus employs an unbalanced piston which is initially fixated in a run-in position. The piston has a flowpath therethrough in which is mounted a check valve. Initially, pressure is applied to above and below the piston which results in an unbalanced force on the piston due to its configuration. Flow to the tool initiates its actuation at this time. When the unbalanced force reaches a predetermined level, the piston is no longer fixated to the housing and begins to accelerate. Acceleration of the piston closes the check valve due to the sudden decrease in pressure behind the check valve and an increase in pressure in front of the check valve as the fluid volume in front of the piston is compressed. Due to the proportional relationship between pressure and area, a magnification of force originally delivered by the pump is achieved for completion of the setting of a downhole tool such as a packer or bridge plug or the like.

DETAILED DESCRIPTION OF THE PREFERRED EMBODIMENT

Figure 1A:
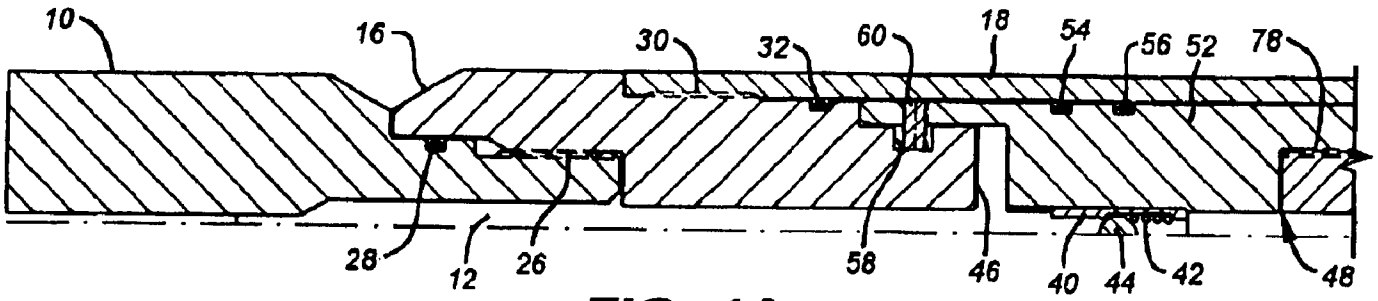
FIGS. 1a–c are a sectional elevational view of the pressure-boosting device of the present invention in the run-in position.
Figure 1B:
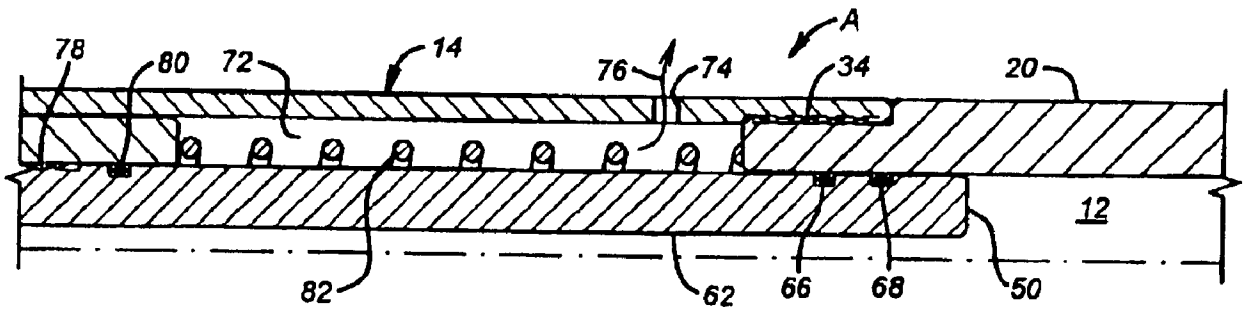
Figure 1C:
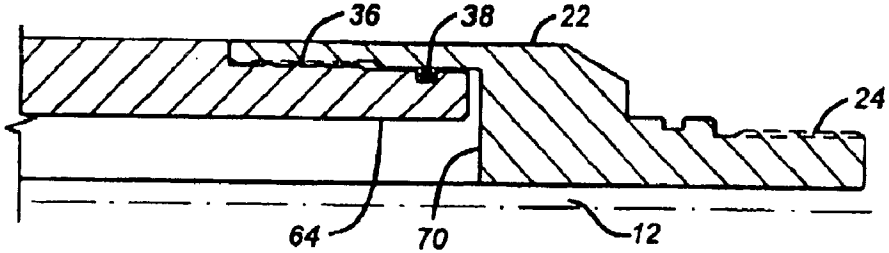

The apparatus A of the present invention is illustrated in detail in FIGS. 1a–c. At the top of the assembly is a bottom sub extender 10, which is a conventional design used commonly in wireline applications to communicate the pressure delivered by a downhole pump or other pressure-building device (not shown) into a central fluid passageway 12, which passes through the body 14 of the apparatus A. Body 14 has four segments: a top sub 16, an upper housing 18, a lower housing 20, and a bottom sub 22. Bottom sub 22 has a thread 24, which is used to secure the bottom sub 22 to the downhole tool string (not shown) such as a packer or bridge plug in the preferred embodiment. Top sub 16 is connected to bottom sub extender 10 at thread 26. Seal 28 secures the connection at thread 26 against fluid leaks. Similarly, thread 30 connects top sub 16 to upper housing 18, with seal 32 securing the seal between those two components. Thread 34 connects the upper housing 18 to the lower housing 20. There is no seal backing up the threaded connection at thread 34 for reasons which will be explained below. Finally, thread 36 connects lower housing 20 to bottom sub 22 with seal 38 sealing off the connection between those two components.

As seen in FIGS. 1a–c, the central fluid passageway 12 extends the length of the apparatus A. Disposed in passageway 12 is a ball seat 40. The ball seat assembly 40 encloses a spring 42 which acts on ball 44. In the position shown in FIG. 1a, there is no pressure being applied and the biasing force of spring 42 keeps ball 44 against ball seat 40. Taken as an assembly, the components, including ball seat 40, spring 42, and ball 44, comprise a check valve assembly. When in the closed position, as shown in FIG. 1a, the passageway 12 is split into an upper segment, which includes surface 46 on piston 48, and a lower segment, which includes surface 50 on piston 48. Other valve or restriction devices can be used without departing from the spirit of the invention, such as a swing check valve, an orifice, or any other valve sensitive to pressure differential for its actuation, or even, less ideally, an orifice.

Piston 48 is illustrated in multi-component form. Surface 46 is part of the piston housing 52. Piston housing 52 is mounted adjacent upper housing 18 with seals 54 and 56 in between. Top sub 16 has a recess 58. A shear pin or shear screw 60 extends through a portion of piston housing 52 and into recess 58. As a result, until the shear pin 60 breaks, the position of the piston 48 is fixed with respect to the apparatus A. The remainder of piston 48 comprises of a lower segment 62 which terminates in bottom surface 50. Lower segment 62 has an annular shape which is sealed against an inner surface 64 of lower housing 20 by virtue of seals 66 and 68. Piston housing 52 is connected to lower segment 62 at thread 78, with the connection between those two components sealed by seal 80. Finally, the piston housing 52 also has a top surface which, along with surface 46 and portions of ball seat 40 at its upper end, comprise the upper surface of the piston 48 which is exposed to applied hydraulic pressure in passageway 12. It is clear that hydraulic pressure applied from the direction of bottom sub extender 10 cannot go between the piston housing 52 and the upper housing 18 due to the presence of seals 54 and 56.

However, applied pressure from extender 10 acts to initially displace ball 44 away from ball seat 40 by virtue of compression of spring 42. Accordingly, the axial force due to applied pressure on top surface of piston housing 52 and surface 46, plus the shear strength of pin 60 in the axial direction, equalizes with the applied pressure in a reverse direction on bottom surface 50. The pressure at surface 50 occurs because, upon application of pressure into passageway 12, the, check valve assembly is open, meaning that the pressure can evenly distribute itself throughout passageway 12 down to the bottom surface 50. Flow to the downhole tool can now occur and initiate the setting. Since by design the bottom surface 50 has a smaller cross-sectional area than the combination of top surface of piston housing 52 and surface 46, and the upper end of the ball seat 40, at a given predetermined pressure level, applied in passageway 12, the net unbalanced force on piston 48 exceeds the ability of the shear pin 60 to retain the piston 48 in its initial -position shown in FIG. 1a. Ultimately, when a predetermined pressure is exceeded, the shear pin 60 breaks and the piston 48 begins to accelerate toward surface 70 on bottom sub 22. Those skilled in the art will appreciate that during subsequent movement of the piston 48 downward, the ratio of fluid volume change above to below the closed check valve (at 40 and 44) will be inversely proportional to the pressure change above to below the same point when measured over the same interval of time. Movement of the piston in this manner is facilitated by a reduction of the volume of chamber 72. However, chamber 72 is equalized with the environment around the apparatus A through a port 74. Arrow 76 illustrates the direction of fluid flow as the volume of chamber 72 decreases by the downward movement of piston 48. Seals 54, 56, 66, 68 and 80 effectively seal portions of chamber 72 as the piston 48 moves. However, since it is desirable to displace fluid out of chamber 72 upon stroking of piston 48, port 74 is sized sufficiently large so as not to create any backpressure which would impede the acceleration of the piston 48.

As the piston 48 begins to accelerate toward surface .70, the volume in the apparatus A at passageway 12 decreases from the check valve assembly down to bottom sub 22. This occurs due to the movement of piston 62 into the cavity above surface 70. Conversely, with the downward movement of the piston 48, the volume of passageway 12 above the check valve assembly rises. The rise in volume of passageway 12 above the check valve assembly reduces the pressure above the check valve assembly. Conversely, the decrease in volume of the passageway 12 below the check valve assembly increases the pressure in that portion of the passageway until piston 48 has moved sufficiently so that the reduction in pressure in passageway 12 adjacent surface 46 is sufficient to allow spring 42 to move ball 44 against seat 40. Those skilled in the art will appreciate that these movements occur almost instantaneously upon the breaking of shear pin 60. Accordingly, for a major portion of its stroke, piston 48 will move downwardly, bringing surface 50 closer to surface 70, with the check valve assembly in the closed position.

Assuming, for the sake of description, that the fluid in passageway 12 is essentially incompressible, the moving piston 48 will try to seek equilibrium as it accelerates towards surface 70. In so doing, the area ratio as between surface 50 compared to surfaces 70 and 46 and the top end of the check valve seat assembly 40 will dictate the degree of pressure amplification experienced at the lower end of passageway 12 and, hence, to the downhole tool. For example, if the area ratio of surfaces 70, 46, and the top end of ball seat 40 to the bottom surface 50 is 3:1, then stroking of the piston toward surface 70 will ultimately, upon setting the tool, result, in a three-fold increase in the applied pressure to the downhole tool (not shown) which is connectable at thread 24. There may be some slight variation in the ratio of the resultant pressure build-up depending on the presence of fluid, which may be slightly compressible, and seal friction. Clearly, those skilled in the art will appreciate that the greater the compressibility of the fluid in passageway 12 at the time the piston 48 strokes, the lower the resultant magnification of pressure will be from the ideal direct relationship described above. Those skilled in the art will also appreciate the general relationship between pressure and area which indicates that the combination of the pressure times the area at the top of the piston 48 will be equal to the pressure and the area at the bottom of the piston 48 in an ideal case involving a fully incompressible fluid. This movement of the piston 48 applies the required pressure which the downhole pump itself (not shown) could not deliver to complete the setting of the downhole tool.

Those skilled in the art will now understand that what has been illustrated is a very simple pressure-boosting device which works fully automatically. The resultant boost forces can be predetermined by the configuration of the piston 48, and its adjacent sealing surfaces. Similarly, depending on the boost force designed into the configuration of piston 48, those skilled in the art can readily select the value of the force required to shear the pin 60 to begin the movement of piston 48. The apparatus A can be resettable for multiple use without removal from the wellbore, as will be described below. The apparatus A has particular application to use of downhole pumps that are run on wireline whose output capability may only be in the range of 2,000–3,000 psig. With the use of the apparatus A, the output pressure from such a pump can be increased to 5,000 psig or more. The only limitations on the ratio of pressure-boosting available are the physical space requirements of the particular well in question and any length requirements or limitations on the apparatus A.

After the apparatus A has been used to set the bridge plug or packer, it can be retrieved to the surface and redressed for subsequent use.

It should be noted that minor modifications from the preferred embodiment illustrated are also considered to be part of the scope of the invention. For example, the piston assembly 48, rather than being initially fixated by a shear pin 60, can be assembled in the apparatus A so that it is resettable upon withdrawal of pressure from passageway 12 without the need to remove it from the wellbore to redress the shear pin 60. For example, a spring or other equivalent biasing member 82 is schematically illustrated in cavity 72. Spring 82 can be a stack of Belleville washers or helical compression spring which will retain the position of piston 48 until a sufficient compressive force is applied to the stack. At that point, the spring can compress, allowing a piston 48 to move toward surface 70. Other types of biasing mechanisms can be used to return the piston 48 to its run-in position upon the removal of the net unbalanced force created by the application of hydraulic fluid pressure in passageway 12, all of which are considered to be within the spirit of the invention.

The foregoing disclosure and description of the invention are illustrative and explanatory thereof, and various changes in the size, shape and materials, as well as in the details of the illustrated construction, may be made without departing from the spirit of the invention.

I claim:

1. A pressure-boosting apparatus [In combinaton] *in combination* with a downhole tool and operated by a wireline-powered downhole pump, comprising:

a pressure-actuated downhole tool operably connected to a wireline-powered downhole pump;

said pressure-boosting apparatus [In] *in* flow communication with said downhole pump, and further comprises:

a body having an inlet to receive [a] *an inlet* pressure source and an outlet connected to the downhole tool;

a piston movably mounted [In] *in* said body, said piston having opposed faces of dissimilar cross-section;

said piston comprises a [towpath] *flowpath* therethrough to allow, at least for a time, flow through said flowpath to the downhole tool to initiate [Its] *its* operation without piston movement, whereupon the creation of an unbalanced force on said piston due to said flow through said [towpath] *flowpath*, said piston [Is] *is* urged to move toward said downhole tool;

said flowpath further comprises a check valve which allows flow toward said downhole tool until sufficient movement of said piston toward said downhole tool forces said check valve to close, which results in the pressure applied to said inlet being magnified at said outlet of said body and said downhole pump to thereby allow said pump, due to said pressure magnification, to produce sufficient pressure to fully operate said downhole tool*; and*

*said check valve is closed without application of said inlet pressure.*

2. The apparatus of claim 1, wherein:

said check valve is operable responsively to pressure on said check valve resulting from movement of said piston.

3. The apparatus of claim 2, wherein:

said check valve is automatically actuated to a closed position upon movement of said piston toward the downhole tool.

4. The apparatus of claim 3, wherein:

said check valve is opened upon application of said [first] *inlet* pressure to said inlet.

5. The apparatus of claim 4, wherein:

said valve is biased closed until application of said [first] *inlet* pressure at said inlet.

6. The apparatus of claim 5, wherein:

said valve comprises a seat coupled with a spring-loaded ball.

7. The apparatus of claim 6, wherein:

said spring keeps said ball against said seat until said [first] *inlet* pressure is applied at said inlet, whereupon said ball is driven off said seat; and upon a subsequent application of a force of a predetermined value on said piston, said piston moves to assist in actuation of the downhole tool;

said spring reseats said ball on said seat as movement of said piston increases pressure on the downhole tool, which tends to move said ball to said seat.

8. The apparatus of claim 7, wherein:

said piston is initially retained to said body [unit] *until* application of said first pressure creates a sufficient force to break loose said piston to allow it to accelerate.

9. The apparatus of claim 7, further comprising:

a biasing member acting on said piston upon removal of said first applied pressure to restroke said piston toward said inlet to facilitate reuse of the apparatus without removal from the wellbore.

10. The apparatus of claim 1, wherein:

said piston is initially retained to said body until application of said first pressure create a sufficient force to break loose said piston to allow it to accelerate.

11. The apparatus of claim 10, wherein:

said check valve is opened upon application of said [first] *inlet* pressure to said inlet.

12. The apparatus of claim 11, wherein:

said check valve is biased closed until application of said [first] *inlet* pressure at said inlet.

13. The apparatus of claim 12, wherein:

said check valve comprises a seat coupled with a spring-loaded ball.

14. The apparatus of claim 13, wherein:

said spring keeps said ball against said seat until said first pressure is applied at said inlet, whereupon said ball is driven off said seat; and upon a subsequent application of a force of a predetermined value on said piston, said piston moves to assist in actuation of the downhole tool;

said spring reseats said ball on said seat as movement of said piston increases pressure on the downhole tool, which tends to move said ball to said seat.

15. The apparatus of claim 1, further comprising:

a biasing member acting on said piston upon removal of said first applied pressure to restroke said piston toward said inlet to facilitate reuse of the apparatus without removal from the wellbore.

* * * * *